(12) United States Patent
Tonry et al.

(10) Patent No.: US 12,717,939 B2
(45) Date of Patent: Aug. 25, 2026

(54) SYSTEMS AND METHODS FOR WIPING DATA FROM DATA PROCESSING SYSTEMS

(71) Applicant: Dell Products L.P., Round Rock, TX (US)

(72) Inventors: Richard M. Tonry, Georgetown, TX (US); Abeye Teshome, Austin, TX (US); Bassem El-Azzami, Austin, TX (US); Mohit Arora, Frisco, TX (US); Vinodkumar Vasudev Ottar, McKinney, TX (US); Luis Antonio Valencia Reyes, Waxahachie, TX (US); Adolfo Sandor Montero, Pflugerville, TX (US); Rajaravi Chandra Kollarapu, Allen, TX (US)

(73) Assignee: Dell Products L.P., Round Rock, TX (US)

( * ) Notice: Subject to any disclaimer, the term of this patent is extended or adjusted under 35 U.S.C. 154(b) by 17 days.

(21) Appl. No.: 18/649,134

(22) Filed: Apr. 29, 2024

(65) Prior Publication Data

US 2025/0335611 A1 Oct. 30, 2025

(51) Int. Cl.
*G06F 21/60* (2013.01)

(52) U.S. Cl.
CPC .................................. *G06F 21/604* (2013.01)

(58) Field of Classification Search
CPC ..... G06F 21/604; H04L 67/60; H04L 63/123; H04L 63/126
See application file for complete search history.

(56) References Cited

U.S. PATENT DOCUMENTS

| | | | |
|---|---|---|---|
| 7,969,909 | B2 | 6/2011 | Oerton |
| 8,042,182 | B2 | 10/2011 | Milani Comparetti et al. |
| 8,477,647 | B2 | 7/2013 | Tamura |
| 8,533,345 | B2 | 9/2013 | Fedotenko |
| 8,538,023 | B2 | 9/2013 | Yao |

(Continued)

FOREIGN PATENT DOCUMENTS

| | | | |
|---|---|---|---|
| CN | 105530121 | A | 4/2016 |
| CN | 109756797 | A | 5/2019 |

(Continued)

OTHER PUBLICATIONS

Latvala et al., "Evaluation of Out-of-Brand Channels for IoT Security", SN Computer Science, pp. 1-17 (Year: 2020).

(Continued)

*Primary Examiner* — Tan Doan
(74) *Attorney, Agent, or Firm* — WOMBLE BOND DICKINSON (US) LLP

(57) ABSTRACT

Methods and systems for managing operations of a data processing system are disclosed. To manage operations of the data processing system, wipeout policies may be obtained by a management controller of the data processing system as part of a provisioning process for the data processing system. The wipeout policies may define types and/or portions of data for removal from the data processing system, entities with authorization to initiate removal of portions of data from the data processing system, and procedures for validating requests to wipe portions of data. The management controller may utilize the wipeout policies to identify an action set to perform to service the wipeout requests.

20 Claims, 6 Drawing Sheets

(56) References Cited

U.S. PATENT DOCUMENTS 8,615,785 B2 12/2013 Elrod et al.
8,924,620 B2 12/2014 Harriman et al.
9,215,244 B2 12/2015 Ayyagari et al.
9,319,967 B2 4/2016 Jonker
9,413,783 B1 8/2016 Keogh
9,734,169 B2 8/2017 Redlich et al.
9,843,624 B1 12/2017 Taaghol
9,980,213 B2 5/2018 Lynch
9,985,847 B2 5/2018 Tung
9,990,382 B1 6/2018 Dias
10,079,842 B1 9/2018 Brandwine
10,176,308 B2 1/2019 Mintz et al.
10,298,670 B2 5/2019 Ben-Shael et al.
10,341,939 B2 7/2019 Peng
10,362,608 B2 7/2019 Gorajala Chandra
10,671,765 B2 6/2020 Swierk et al.
10,972,508 B1 4/2021 Dods
11,036,902 B2 6/2021 Nicholas
11,102,122 B2 8/2021 Seed et al.
11,134,380 B2 9/2021 Fox et al.
11,399,283 B2 7/2022 Anantha
11,487,274 B2 11/2022 Valder et al.
11,792,267 B2 10/2023 Kreiner et al.
12,034,765 B1 7/2024 Barkan
12,143,265 B1 * 11/2024 El-Azzami .......... H04L 41/0806
12,302,236 B2 5/2025 Grayson
2002/0199120 A1 12/2002 Schmidt
2005/0066067 A1 * 3/2005 Suh ......................... G06F 9/526 710/1
2009/0197571 A1 8/2009 Kitajima
2010/0083381 A1 4/2010 Khosravi
2010/0169949 A1 7/2010 Rothman
2011/0087387 A1 4/2011 Safa-Bakhsh et al.
2011/0119765 A1 5/2011 Hering
2013/0152161 A1 6/2013 Onno
2014/0157405 A1 6/2014 Joll
2014/0366105 A1 12/2014 Bradley
2016/0098561 A1 4/2016 Keller
2016/0345171 A1 11/2016 Kulkarni
2016/0378103 A1 12/2016 Malinowski
2017/0063932 A1 3/2017 Hubbard
2017/0230179 A1 8/2017 Mannan
2017/0244753 A1 8/2017 Hu
2018/0039946 A1 2/2018 Bolte et al.
2018/0082066 A1 * 3/2018 Munjal ............... G06F 21/6209
2018/0145915 A1 5/2018 Caputo, II
2018/0176215 A1 6/2018 Perotti
2019/0034382 A1 * 1/2019 Hargrave .............. G06F 3/0665
2019/0294782 A1 9/2019 Cudak
2020/0092251 A1 3/2020 Peterson
2020/0366754 A1 * 11/2020 Wang .................... H04L 9/3247
2021/0034048 A1 2/2021 Hajizadeh
2021/0073211 A1 3/2021 Wright, Sr.
2021/0211450 A1 7/2021 Aleidan
2021/0258808 A1 8/2021 Mahimkar
2021/0357255 A1 11/2021 Mahadik
2021/0382635 A1 * 12/2021 Ma ........................ G06F 3/0659
2021/0385159 A1 12/2021 Memedagic
2022/0038659 A1 2/2022 Michel
2022/0207193 A1 6/2022 Caraccio
2022/0300960 A1 9/2022 Gutzeit
2023/0027152 A1 1/2023 Doshi
2023/0199868 A1 6/2023 Kedalagudde
2023/0412619 A1 12/2023 Tshouva
2024/0069808 A1 * 2/2024 Bukhari ................ G06F 3/0659
2024/0195837 A1 6/2024 Duplys
2025/0138839 A1 5/2025 Teshome
2025/0138936 A1 * 5/2025 Thiruchengode Vajravel ............. G06F 11/0793
2025/0138945 A1 5/2025 Teshome
2025/0139298 A1 5/2025 Ottar
2025/0141814 A1 5/2025 Montero
2025/0141880 A1 5/2025 Teshome
2025/0142444 A1 5/2025 Arora
2025/0245059 A1 7/2025 Kollarapu
2025/0245353 A1 7/2025 Montero
2025/0247670 A1 7/2025 Montero
2025/0247703 A1 7/2025 El-Azzami

FOREIGN PATENT DOCUMENTS

CN 113221197 A * 8/2021 ............. G06F 21/80
CN 117439758 A 1/2024
EP 4535743 A1 4/2025

OTHER PUBLICATIONS

Santos et al., "gym-hpa: Efficient Auto-Scaling via Reinforcement Learning for Complex Microservice-based Applications in Kubernetes", May 8, 2023, IEEE, NOMA 2023-2023 IEEE/IFIP Network Operations and Management Symposium (2023, pp. 1-9, 9 pages).

* cited by examiner

SYSTEMS AND METHODS FOR WIPING DATA FROM DATA PROCESSING SYSTEMS

FIELD

Embodiments disclosed herein relate generally to managing data processing systems. More particularly, embodiments disclosed herein relate to systems and methods to manage requests to wipe data stored by data processing systems using at least a management controller.

BACKGROUND

Computing devices may provide computer-implemented services. The computer-implemented services may be used by users of the computing devices and/or devices operably connected to the computing devices. The computer-implemented services may be performed with hardware components such as processors, memory modules, storage devices, and communication devices. The operation of these components and the components of other devices may impact the performance of the computer-implemented services.

BRIEF DESCRIPTION OF THE DRAWINGS

Embodiments disclosed herein are illustrated by way of example and not limitation in the figures of the accompanying drawings in which like references indicate similar elements.

DETAILED DESCRIPTION

Figure 1A:
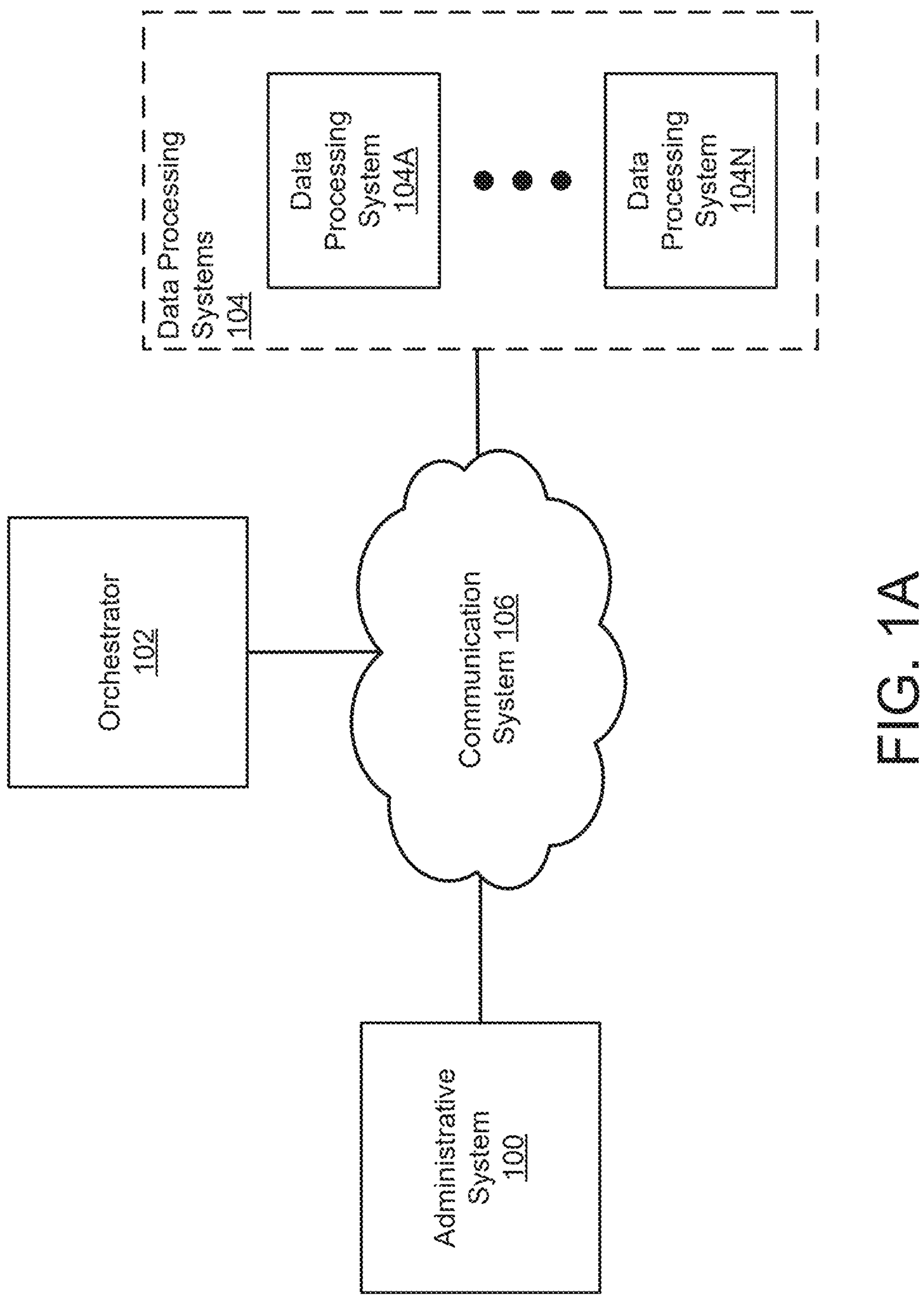
FIG. 1A shows a block diagram illustrating a system in accordance with an embodiment.

Various embodiments will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment. The appearances of the phrases "in one embodiment" and "an embodiment" in various places in the specification do not necessarily all refer to the same embodiment.

References to an "operable connection" or "operably connected" means that a particular device is able to communicate with one or more other devices. The devices themselves may be directly connected to one another or may be indirectly connected to one another through any number of intermediary devices, such as in a network topology.

In general, embodiments disclosed herein relate to methods and systems for managing operation of data processing systems. The data processing systems may provide computer-implemented services to any type and number of other devices and/or users of the data processing systems. The computer-implemented services may include any quantity and type of such services.

The computer-implemented services that may be provided may include data management services for a user of the data processing system. To provide data management services, the data management system may store sensitive data including credential data established for a user during an onboarding process of the data processing system. For example, during an onboarding process of the data processing system, a user of the data processing system may input user credentials (e.g., unique user identification number, password, or other login credentials) into the data processing system to configure operations of the data processing system.

Unauthorized access to sensitive data stored on the data processing system and/or to operation of the data processing system (e.g., by a malicious entity) may be disadvantageous to the user of the data processing system. For example, if a data processing system is returned to the manufacturer of the data processing system for repair services, the sensitive data stored on the data processing system for the user may be accessible (e.g., inadvertently or advertently) by the manufacturer and therefore pose a threat to the user if the sensitive data is exposed.

To manage exposure of sensitive data, a wiping request may be initiated by an administrator or user of the data processing system. The wiping request may include a request to modify (e.g., permanently delete, restrict, etc.) portions of data stored by the data processing system. The portions of data to be removed by include application data, sensitive data, for example, cryptographic information (e.g., certificate, keys, etc.), data stored in a particular hardware component of the data processing system (e.g., trusted platform module, hard disk drive, etc.), data relating to credentialing for use of the data processing system, etc.

Initiation of the wipeout request may depend on a requesting entity's authority to modify portions of data (as specified by the wipeout request). For example, an administrative system of the data processing system may have authorization to remove a portion of data from the data processing system and may initiate removal of the portion of data by providing the wipeout request to the data processing system. However, compromise of an authorized entity (e.g., by a malicious entity) may be problematic for the user of the data processing system as the compromised entity may issue a wipeout request that could permanently delete or remove valuable data from the data processing system.

To prevent unauthorized wipeout requests, wipeout policies for the data processing system may be established during provisioning process of the data processing system and may be enforced using out-of-band components that verifies wipeout requests to be in compliance with the corresponding wipeout policies and confirms authentication of the wipeout requests. By doing so, managing wipeout requests may be implemented without utilizing an operating system of the data processing system and/or in the event that the in-band components of the data processing system are not functional (e.g., powered off). By doing so, authorized modifications (e.g., removal, restrictions, or limitations) to portions of data stored on the data processing system may be managed remotely (e.g., from a different geographic location from the data processing system) and the likelihood of unauthorized modifications may be decreased while enabling authorized modifications to be performed.

In an embodiment, a method of managing operation of a data processing system is provided. The method may include: obtaining, by a management controller of the data processing system and via an out-of-band channel, a wipeout request, the wipeout request indicating that a portion of data stored on the data processing system is to be removed; identifying, by the management controller, a wipeout policy that governs the wipeout request; attempting to verify authenticity of the wipeout request based on authentication requirements specified by the wipeout policy; in a first instance of the attempting where the wipeout request is authenticated: analyzing the wipeout request and the wipeout policy to identify whether any conflicts exist; in a first instance of the analyzing where at least one conflict exists: performing a conflict resolution process to identify a first action set to perform; performing the first action set to service the wipeout request; in a second instance of the analyzing where no conflicts exist: performing a second action set based on the wipeout request to service the wipeout request.

The first action set may include: adding a log entry specifying that the at least one conflict exists; and performing an implementation action to implement a portion of the wipeout request that is in conflict with the wipeout policy.

The first action set may also include: for a portion of the wipeout request that is in conflict with the wipeout policy: at least temporarily delaying performance of any action based on the portion of the wipeout request; and while the performance is temporarily delayed, performing a remedial action set based on the portion of the wipeout request to attempt to authenticate the portion of the wipeout request.

The first action set may also include: rejecting the wipeout request.

The wipe policy may specify: targets that specify portions of the data hosted by the data processing system, wherein the targets specify the portions of the data at levels of granularity from a list of levels of granularity consisting of: all of the portions of the data stored in a particular hardware component; a portion of the data relating to credentialing for use of the data processing system; a portion of the data related to configuration of the data processing system; a portion of the data related to ownership of the data processing system; and a portion of the data related to end owner configuration of the data processing system.

The wipe policy may further specify: for each target of the targets, allowable wipeout procedures for removing access to the corresponding portion of the data.

Attempting to verify authenticity of the wipeout request may include: obtaining, by the management controller, an identity of a requesting entity based at least in part on the wipeout request; performing a comparison process using the identity of the requesting entity and the authentication requirements to determine whether the requesting entity is authorized to initiate removal of portions of data from the data processing system; in a first instance of performing the comparison process where the requesting entity is authorized: concluding that wipeout request is trustworthy; in a second instance of performing the comparison process where the requesting entity is not the authorized device: concluding that the wipeout request is not trustworthy; and rejecting the wipeout request based on the wipeout request not being trustworthy.

Analyzing the wipeout request may include: identifying, based on the wipeout request, the portion of data for removal; identifying, based on the wipe policy and the identified portion of data, a removal workflow to be performed; and performing a comparison process using the wipeout request and the removal workflow to determine whether the wipeout request conflicts with the removal workflow.

The method may also include: during an onboarding process for the data processing system to add the data processing system to a deployment and place the data processing system under control of a control plane that manages the deployment: obtaining, from an orchestrator of the control plane and via the out-of-band channel, the wipeout policy for the data processing system.

The data processing system may include a network module adapted to separately advertise network endpoints for the management controller and hardware resources of the data processing system, the network endpoints being usable by a server to address communications to the hardware resources using an in-band communication channel and the management controller using the out-of-band communication channel.

The management controller and the network module are on separate power domains from the hardware resources so that the management controller and the network module are operable while the hardware resources are inoperable.

The out-of-band communication channel may run through the network module, and an in-band communication channel that services the hardware resources may also run through the network module.

The network module may host a transmission control protocol/internet protocol (TCP/IP) stack to facilitate network communications via the out-of-band communication channel.

In an embodiment, a non-transitory media is provided. The non-transitory media may include instructions that when executed by a processor cause the computer-implemented method to be performed.

In an embodiment, a data processing system is provided. The data processing system may include the non-transitory media and a processor, and may perform the method when the computer instructions are executed by the processor.

Turning to FIG. 1A, a block diagram illustrating a distributed environment in accordance with an embodiment is shown. The distributed environment (e.g., the system) shown in FIG. 1A may provide for management of operation of data processing systems that may provide, at least in part, computer-implemented services. The computer-implemented services may include any type and quantity of computer-implemented services. The computer-implemented services may include, for example, database services, data processing services, electronic communication services, and/or any other services that may be provided using one or more computing devices. The computer-implemented services may be provided by, for example, administrative system 100, orchestrator 102, dependent data processing systems 104 and/or any other type of devices (not shown in FIG. 1A). Other types of computer-implemented services may be provided by the system shown in FIG. 1A without departing from embodiments disclosed herein.

The system may include any number of data processing systems 104 (e.g., endpoint devices) that may each include any number of hardware components (e.g., processors, memory modules, storage devices, communications devices). The hardware components may support execution of any number and types of applications (e.g., software components). Dependent data processing systems 104 may provide similar and/or different computer-implemented services and may provide the computer-implemented services independently and/or in cooperation with other devices. Changes in available functionalities of the hardware and/or software components may provide for various types of different computer-implemented services to be provided over time. For more information regarding components of data processing systems 104, refer to the discussion of FIG. 1B.

Operation of and/or computer-implemented services provided by a data processing system (e.g., data processing system 104A) may be negatively impacted if any unauthorized modifications (e.g., to hardware and/or software components of the data processing system, to sensitive data stored by the data processing system, etc.) occur. For example, data processing system 104A may collect, store, and/or manage sensitive data for a user of data processing system 104A which may be used to provide computer-implemented services desired by the user. It may be disadvantageous if the sensitive data was modified (e.g., edited, deleted, etc.) without authorization by the user (e.g., of data processing system 104A) either intentionally or unintentionally. Thus, the computer-implemented services may not be provided as desired if data processing systems 104 (e.g., hardware and/or software components of the data processing system, sensitive data stored by the data processing system, etc.) are modified without authorization from a user and/or administrator of data processing systems 104.

To manage unauthorized modifications of data processing systems 104, requests for modifications to data processing systems 104 may be verified to determine whether the requesting entity (e.g., providing the requests for modifications) has authorization to modify data processing systems 104 prior to initiating the modifications (e.g., specified by the requests). For example, a request to remove data from data processing system 104A may be received from an external device (e.g., another data processing system, personal computing device, etc.) and the request may be signed using a private key of a public key pair associated with the external device. If the external device is a trusted device (by data processing system 104A), data processing system 104A may verify the request using the public key pair of the private key pair and determine the request to be authentic (e.g., from a trusted device). However, this verification process may be unreliable and/or untrustworthy if the trusted device is operated by an unauthorized user (e.g., malicious party intending to initiate unauthorized modifications to data processing system 104A).

In addition, operation of and/or computer-implemented services provided by a data processing system (e.g., data processing system 104A) may be negatively impacted if unauthorized access to and/or operation of the data processing system occurs. Consider a scenario in which data processing system 104A has been physically intercepted (e.g., stolen, lost, etc.) by an unauthorized user and data processing system 104A may be vulnerable to unauthorized modifications by the unauthorized user which may lead to loss and/or manipulation of data stored by data processing system 104A, computer-implemented services not being provided by data processing system 104A as desired, etc. Consequently, in the event data processing system 104A may be compromised, devices operably connected to data processing system 104A (e.g., indirectly and/or directly) may become compromised and, therefore, presenting security concerns for the devices and/or sensitive data stored thereon.

In general, embodiments disclosed herein relate to systems, devices, and methods for managing operation of a data processing system. To manage operation of a data processing system, a system in accordance with an embodiment may utilize wipeout policies accessible by a management controller hosted by the data processing system to verify authentication of requests for modifications to the data processing system and perform authorized wiping procedures. To do so, the management controller may identify a wipeout policy based on the wipeout request and verify authenticity of the wipeout request to determine whether the requesting entity has authorization to request modifications (e.g., specified by the wipeout request). The wipeout policies for the data processing system may specify different targets (e.g., various portions of data hosted by the data processing system) and different wipeout procedures for removing access to the portions of the data.

By doing so, embodiments disclosed herein may facilitate authorized wipeout requests according to wipeout policies for the data processing system and continued provision of desired computer-implemented services by data processing systems. By verifying the authorization of the wipeout request and using the wipeout policies to validate the requested removal of data from a data processing system, potentially unauthorized wipeout requests may be identified and rejected, decreasing the likelihood of unauthorized removal of portions of data (e.g., stored by the data processing system), and/or increasing the likelihood of approved or authorized removal of portions of data being performed.

To perform the above-mentioned functionality, the system of FIG. 1A may include administrative system 100, orchestrator 102, and/or data processing systems 104. Administrative system 100, orchestrator 102, and/or data processing systems 104, and/or any other type of devices not shown in FIG. 1A may perform all, or a portion of the computer-implemented services independently and/or cooperatively. Each of these components is discussed below.

Data processing systems 104 may include any number and/or type of data processing systems (e.g., 104A-104N). Data processing systems 104 may provide desired computer-implemented services according to wipeout policies of data processing systems 104. Managing wipeout policies for data processing systems 104 may include implementing limitations and/or removal of data from data processing systems 104, for example, based on receiving wipeout requests for data processing systems 104. When analyzing and executing a wipeout request (e.g., request to remove portion(s) of data) for any of data processing systems (e.g., 104A-104N), an administrator and/or user (e.g., of data processing systems 104) may rely on hardware resources of data processing systems 104 to be functional (e.g., powered on), and an operating system management tool (e.g., hosted by an operating system of a data processing system) to verify authority of the wipeout request, identify the applicable wipeout policy, and implement removal of the portion of data (e.g., cryptographic data, application data, etc.) as specified by the wipeout request. If the operating system management tool is not fully booted up (e.g., turned on, functional, etc.) and/or connected to internet, then the wipeout request for data processing systems 104 may not be executed.

To remove the dependency of functional hardware resources to initiate provisioning process and perform wipeout request management services, data processing systems 104 may include out-of-band components (e.g., a network module, a management controller, etc.) that functionally may allow data exchange between the out-of-band components independently from in-band components of data processing systems 104. For more information regarding out-of-band components of data processing systems 104, refer to the discussion of FIG. 1B.

The out-of-band components of data processing systems 104 may be utilized to manage wipeout requests. To manage wipeout requests, the out-of-band components of data processing systems 104 may (i) obtain wipeout policies (e.g., policies specifying portions of data and removal workflows delineating procedures to remove the portions of data from the data processing system), (ii) obtain a wipeout request (e.g., indicating portions of data to remove from the data processing system), (iii) identify a wipeout policy that governs the wipeout request, (iv) attempt to verify authenticity of the wipeout request based on authentication requirements specified by the wipeout policy, (v) based on the wipeout request being authenticated, analyze the wipeout request and the wipeout policy to identify whether any conflicts exist, (vi) in a first instance of the analyzing where at least one conflict exists: perform a conflict resolution process to identify an action set to be performed, (vii) in a second instance of the analyzing where no conflict exists: perform an action set based on the wipeout request to service the wipeout request, (viii) notifying a requesting entity of the status of the wipeout request, and/or perform other actions relating to facilitating wipeout request management services for data processing systems 104.

Administrative system 100 may include any number and/or type of administrative systems (e.g., other data processing systems, management systems, storage devices, user devices, etc.) that may participate in providing computer-implemented services. To perform its functionality, administrative system 100 may communicate requests (e.g., including wipeout requests) to orchestrator 102.

To provide computer-implemented services, administrative system 100 may, for example, (i) identify a data processing system (e.g., 104A) that needs to be onboarded, (ii) receive communications from orchestrator 102 when data processing system 104A has been onboarded, (iii) provide a request to orchestrator 102 indicating modifications (e.g., removal, restrictions, etc.) to data stored by data processing system 104A, (iv) receive notifications from orchestrator 102 indicating status of servicing the wipeout request, and/or (v) perform other actions that may facilitate management services to be provided by data processing system 104A.

Orchestrator 102 may include any number and/or type of orchestrators (e.g., other data processing systems, user devices, etc.) that may participate in providing computer-implemented services, such as management services. Orchestrator 102 may also store and manage device registrations, entitlements, and/or other information related to data processing systems 104. To perform its functionality, orchestrator 102 may communicate (e.g., exchange data) with the out-of-band components of data processing system 104A using out-of-band communication channels. For example, orchestrator 102 may provide wipeout policies for data processing system 104A via a management controller of data processing system 104A (e.g., bypassing any in-band components of data processing system 104A).

To provide management services, orchestrator 102 may, for example, (i) identify applicable wipeout policies for implementation of modification to data stored on data processing systems 104, (ii) provide the applicable wipeout policies to the management controller (e.g., via out-of-band communication channels), (iii) receive a request to modify (e.g., remove, restrict, etc.) data stored on data processing systems 104 from administrative system 100, (iv) receive notifications from the management controller (e.g., via the out-of-band communication channels) regarding status of the completion of the wipeout request, and/or (vi) perform other actions that may facilitate management services.

Figure 2A:
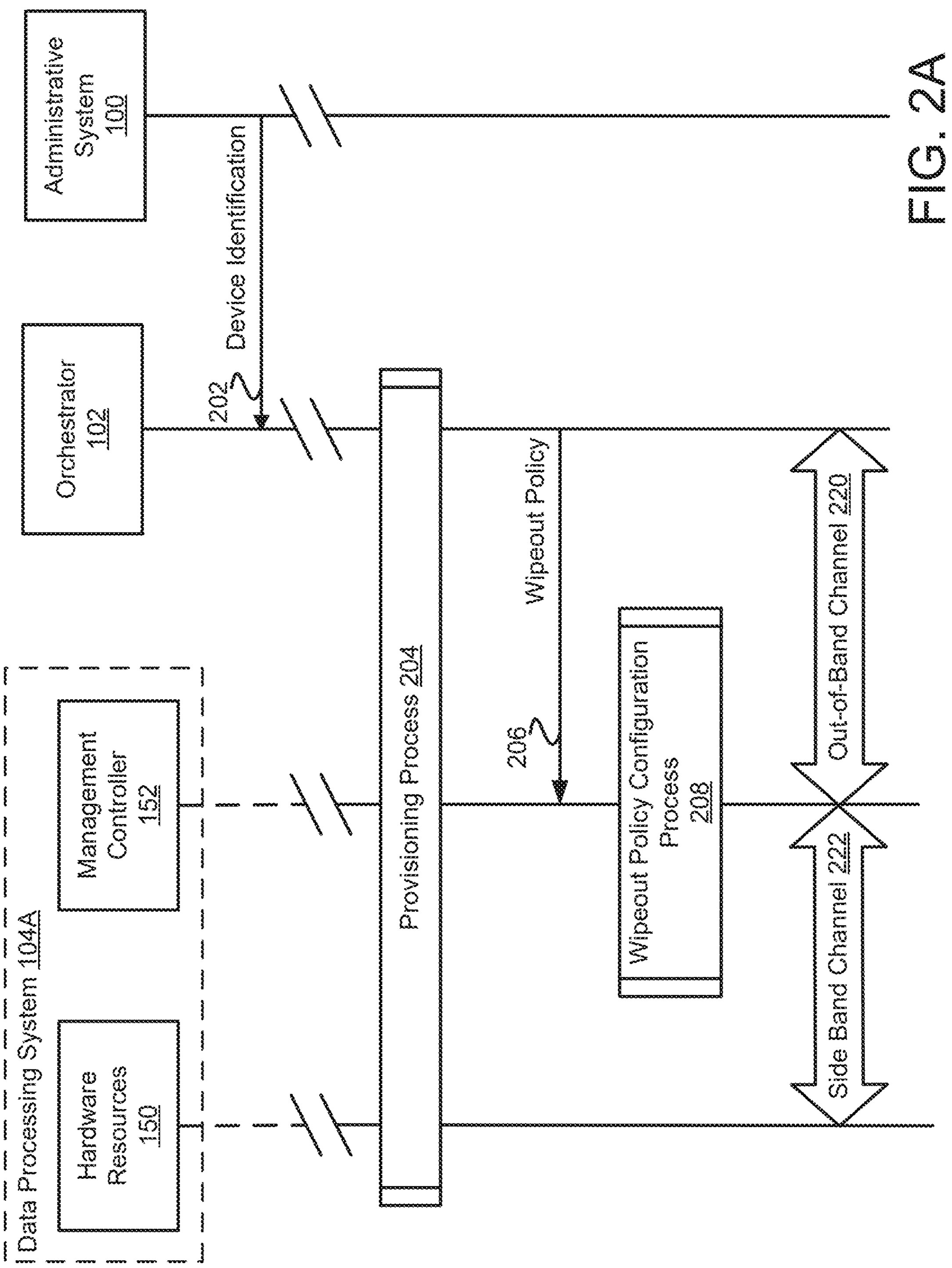
FIGS. 2A-2B show interaction diagrams in accordance with an embodiment.
Figure 2B:
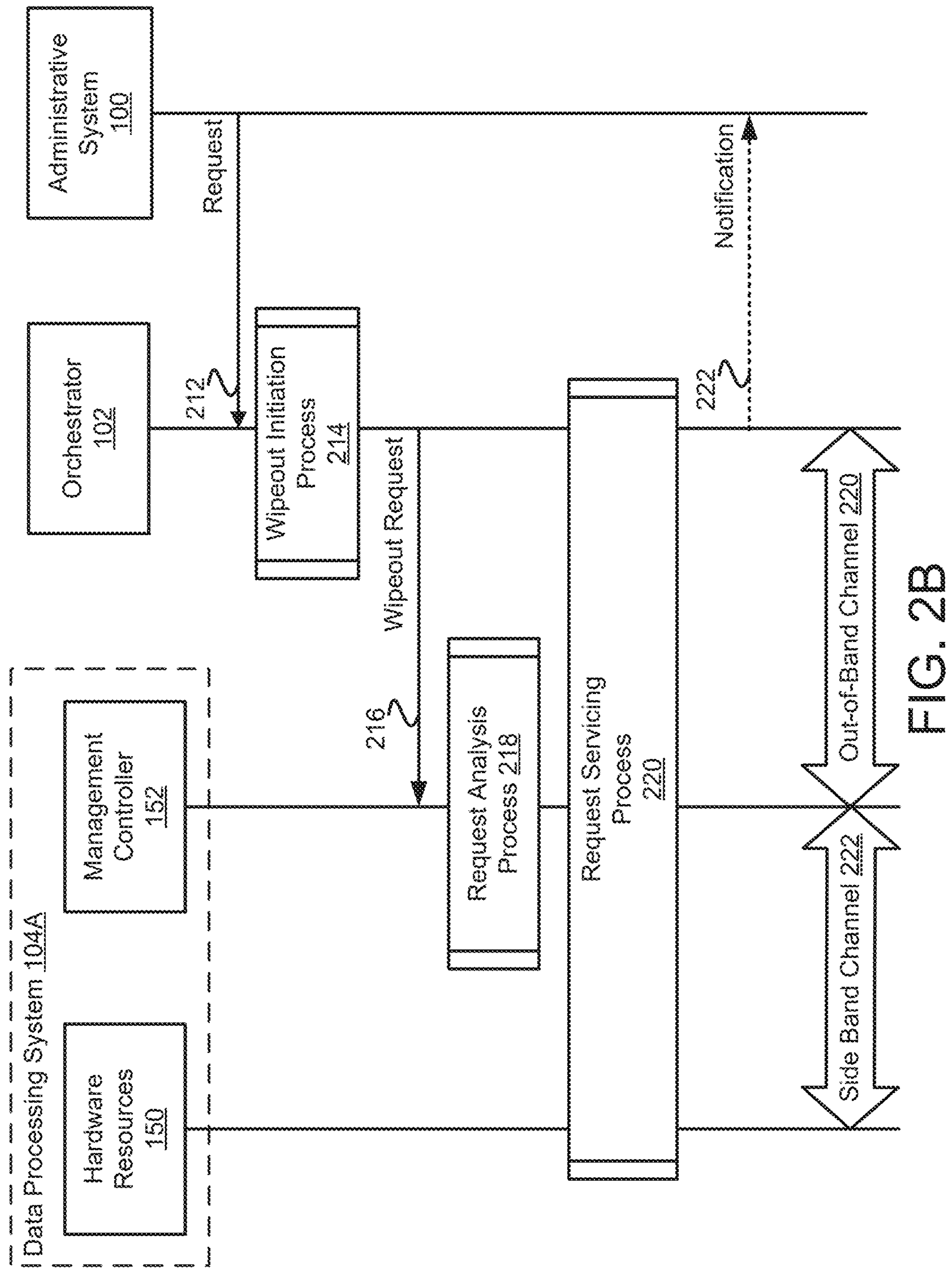

Refer to FIGS. 2A-2B for additional details regarding establishing wipeout policies for a data processing system and management of wipeout requests for the data processing system.

Figure 3:
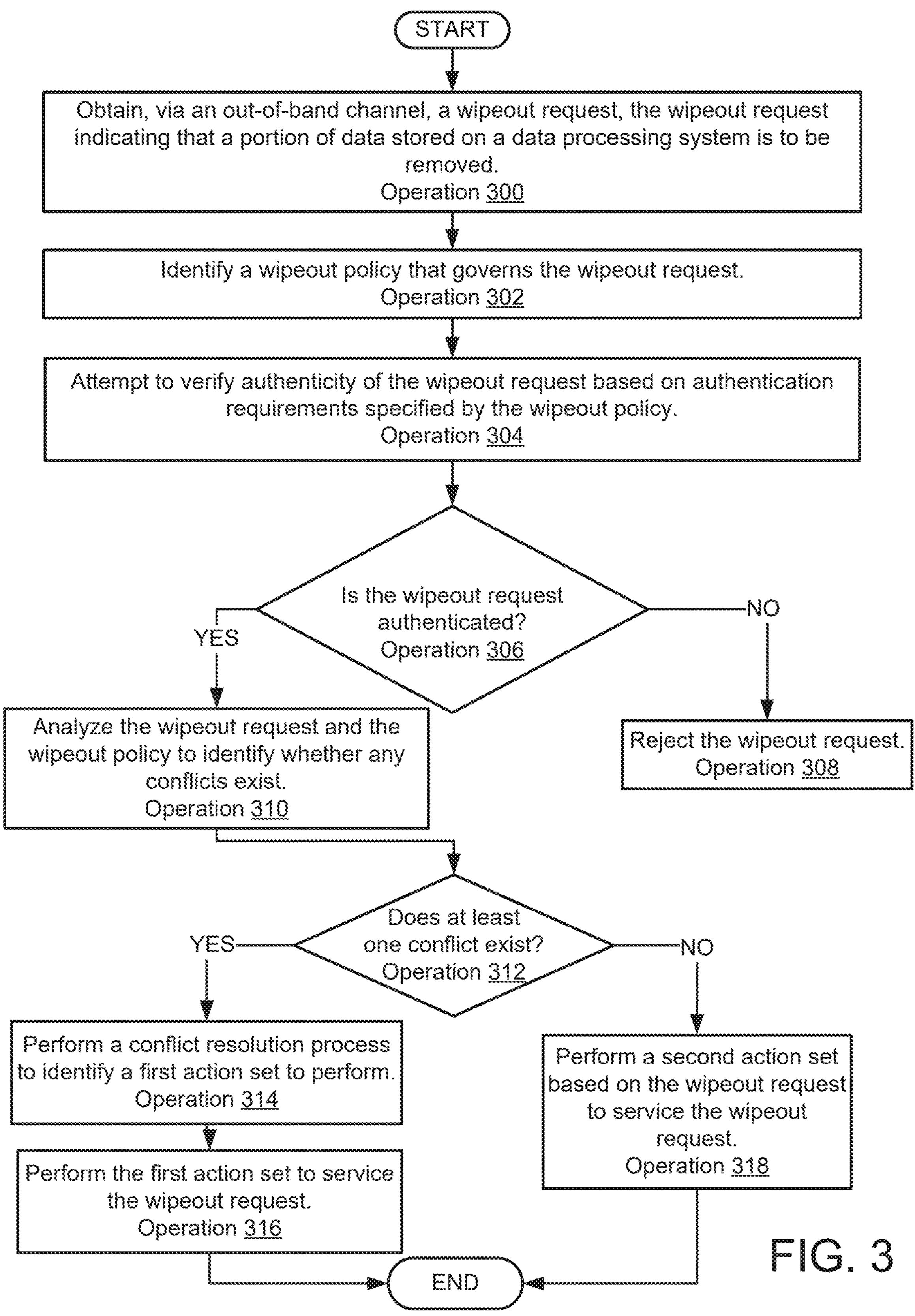
FIG. 3 shows a flow diagram illustrating a method of managing operation of a data processing system in accordance with an embodiment.

When providing their functionality, any of administrative system 100, orchestrator 102, and/or data processing systems 104 may perform all, or a portion of the methods shown in FIGS. 2A-3.

Any of (and/or components thereof) administrative system 100, orchestrator 102, and/or data processing systems 104 may be implemented using a computing device (also referred to as a data processing system) such as a host or a server, a personal computer (e.g., desktops, laptops, and tablets), a "thin" client, a personal digital assistant (PDA), a Web enabled appliance, a mobile phone (e.g., smartphone), an embedded system, local controllers, an edge node, and/or any other type of data processing device or system. For additional details regarding computing devices, refer to the discussion of FIG. 4.

Any of the components illustrated in FIG. 1A may be operably connected to each other (and/or components not illustrated) with communication system 106.

Communication system 106 may include one or more networks that facilitate communication between any number of components. The networks may include wired networks and/or wireless networks (e.g., and/or the Internet). The networks may operate in accordance with any number and types of communication protocols (e.g., such as the internet protocol).

Communication system 106 may be implemented with one or more local communications links (e.g., a bus interconnecting a processor of any of data processing system 102 and cloud service system 100).

Communication system 106 may include out-of-band communication channels, in-band communication channels, and/or other types of communication channels.

Figure 1B:
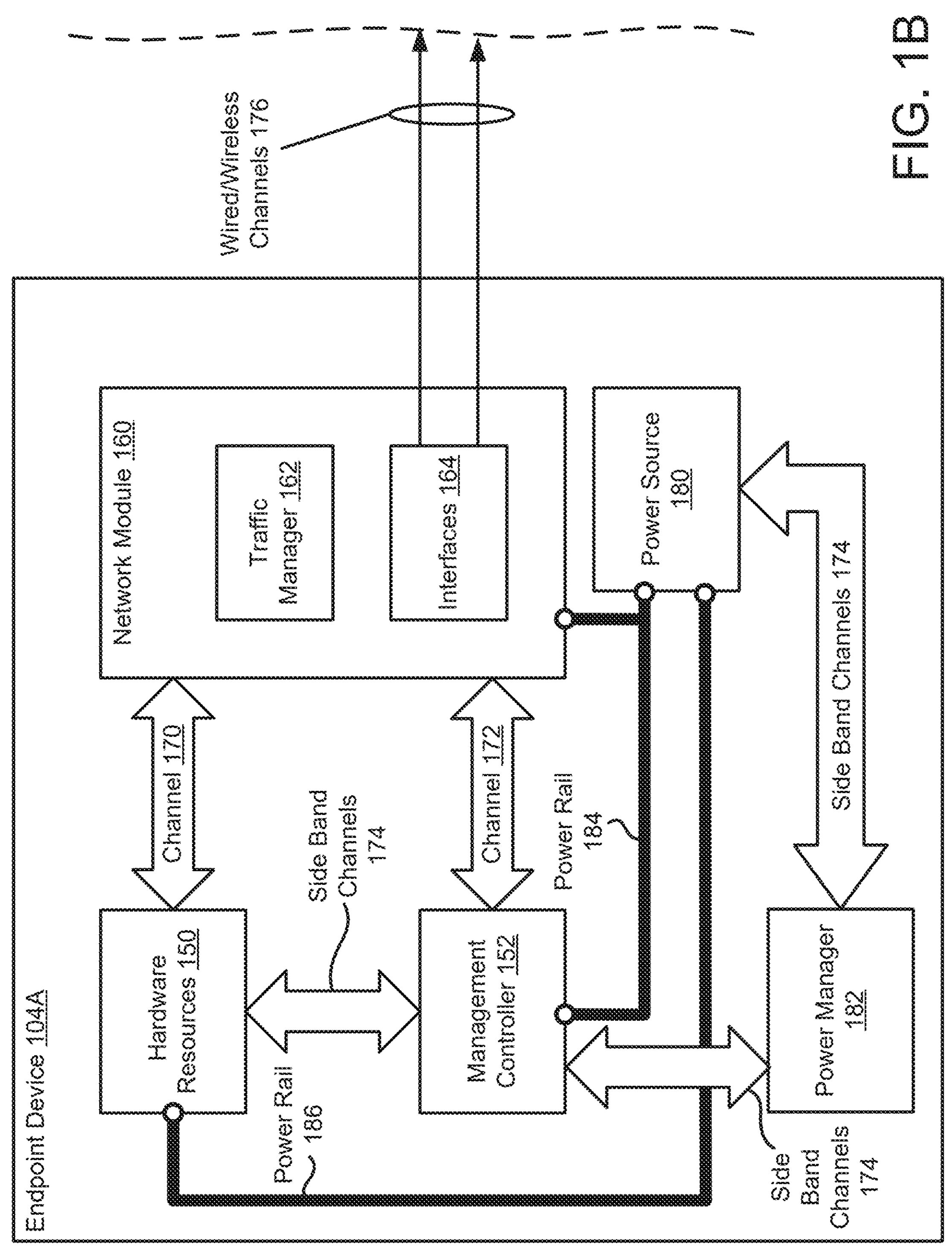
FIG. 1B shows a block diagram illustrating a data processing system in accordance with an embodiment.

Refer to FIG. 1B for additional details regarding the management controller, network module, in-band communication channel, out-of-band communication channel, and/or hardware resources of data processing systems 104.

While illustrated in FIG. 1A as including a limited number of specific components, a system in accordance with an embodiment may include fewer, additional, and/or different components than those illustrated therein. For example, while the system of FIG. 1A shows a single orchestrator (e.g., 102), it will be appreciated that the system may include any number of orchestrators.

Turning to FIG. 1B, a diagram illustrating data processing system 104A in accordance with an embodiment is shown. Data processing system 104A may be similar to any of data processing systems 104 shown in FIG. 1A.

To provide computer-implemented services, data processing system 104A may include any quantity of hardware resources 150. Hardware resources 150 may be in-band hardware components, and may include a processor operably coupled to memory, storage, and/or other hardware components.

The processor may host various management entities such as operating systems, drivers, network stacks, and/or other software entities that provide various management functionalities. For example, the operating system and drivers may provide abstracted access to various hardware resources. Likewise, the network stack may facilitate packaging, transmission, routing, and/or other functions with respect to exchanging data with other devices.

For example, the network stack may support transmission control protocol/internet protocol communication (TCP/IP) (e.g., the Internet protocol suite) thereby allowing hardware resources 150 to communicate with other devices via packet switched networks and/or other types of communication networks.

The processor may also host various applications that provide the computer-implemented services. The applications may utilize various services provided by the management entities and use (at least indirectly) the network stack to communicate with other entities.

However, use of the network stack and the services provided by the management entities may place the applications at risk of indirect compromise. For example, if any of these entities trusted by the applications are compromised, these entities may subsequently compromise the operation of the applications. For example, if various drivers and/or the communication stack are compromised, communications to/from other devices may be compromised. If the applications trust these communications, then the applications may also be compromised.

For example, to communicate with other entities, an application may generate and send communications to a network stack and/or driver, which may subsequently transmit a packaged form of the communication via channel 170 to a communication component, which may then send the packaged communication (in a yet further packaged form, in some embodiments, with various layers of encapsulation being added depending on the network environment outside of data processing system 102) to another device via any number of intermediate networks (e.g., via wired/wireless channels 176 that are part of the networks).

In addition, different configurations of hardware resources 150 and/or software resources may be implemented by data processing system 102 based on the type of computer-implemented services that are to be provided. Modifications to configurations of hardware resources 150 and/or the software resources may lead to downtime for data processing system 104A and may consume network bandwidth of channel 170.

To reduce the downtime of data processing system 104A and to reduce the likelihood of the applications and/or other in-band entities from being indirectly compromised, data processing system 104A may include management controller 152 and network module 160. Each of these components of data processing system 104A is discussed below.

Management controller 152 may be implemented, for example, using a system on a chip or other type of independently operating computing device (e.g., independent from the in-band components, such as hardware resources 150, of a host data processing system 104A). Management controller 152 may provide various management functionalities for data processing system 104A. For example, management controller 152 may monitor various ongoing processes performed by the in-band components, may manage power distribution, thermal management, and/or other functions of data processing system 104A.

To do so, management controller 152 may be operably connected to various components via side band channels 174 (in FIG. 1B, a limited number of side band channels are included for illustrative purposes, it will be appreciated that management controller 152 may communicate with other components via any number of side band channels). The side band channels may be implemented using separate physical channels, and/or with a logical channel overlay over existing physical channels (e.g., logical division of in-band channels). The side band channels may allow management controller 152 to interface with other components and implement various management functionalities such as, for example, general data retrieval (e.g., to snoop ongoing processes), telemetry data retrieval (e.g., to identify a health condition/other state of another component), function activation (e.g., sending instructions that cause the receiving component to perform various actions such as displaying data, adding data to memory, causing various processes to be performed), and/or other types of management functionalities.

For example, to reduce the likelihood of indirect compromise of an application hosted by hardware resources 150, management controller 152 may enable information from other devices to be provided to the application without traversing the network stack and/or management entities of hardware resources 150. To do so, the other devices may direct communications including the information to management controller 152. Management controller 152 may then, for example, send the information via side band channels 174 to hardware resources 150 (e.g., to store it in a memory location accessible by the application, such as a shared memory location, a mailbox architecture, or other type of memory-based communication system) to provide it to the application. Thus, the application may receive and act on the information without the information passing through potentially compromised entities. Consequently, the information may be less likely to also be compromised, thereby reducing the possibility of the application becoming indirectly compromised. Similar processes may be used to facilitate outbound communications from the applications.

Management controller 152 may be operably connected to communication components of data processing system 104A via separate channels (e.g., 172) from the in-band components, and may implement or otherwise utilize a distinct and independent network stack (e.g., TCP/IP). Consequently, management controller 152 may communicate with other devices independently of any of the in-band components (e.g., does not rely on any hosted software, hardware components, etc.). Accordingly, compromise of any of hardware resources 150 and hosted component may not result in indirect compromise of any management controller 152, and entities hosted by management controller 152.

To facilitate communication with other devices, data processing system 104A may include network module 160. Network module 160 may provide communication services for in-band components and out-of-band components (e.g., management controller 152) of data processing system. Specifically, an out-of-band communication channel (e.g., 172) that services management controller 152 and an in-band communication channel (e.g., 170) that services hardware resources 150 may run through network module 160. Network module 160 may host a TCP/IP stack to facilitate network communications via the out-of-band communication channel. To do so, network module 160 may include traffic manager 162 and interfaces 164.

Traffic manager 162 may include functionality to (i) discriminate traffic directed to various network endpoints advertised by data processing system 104A, and (ii) forward the traffic to/from the entities associated with the different network endpoints. For example, to facilitate communications with other devices, network module 160 may advertise different network endpoints (e.g., different media access control address/internet protocol addresses) for the in-band components and out-of-band components. Thus, other entities may address communications to these different network endpoints. When such communications are received by network module 160, traffic manager 162 may discriminate and direct the communications accordingly (e.g., over channel 170 or channel 172, in the example shown in FIG. 1B, it will be appreciated that network module 160 may discriminate traffic directed to any number of data units and direct it accordingly over any number of channels).

Accordingly, traffic directed to management controller 152 may never flow through any of the in-band components. Likewise, outbound traffic from the out-of-band component may never flow through the in-band components.

To support inbound and outbound traffic, network module 160 may include any number of interfaces 164. Interfaces 164 may be implemented using any number and type of communication devices which may each provide wired and/or wireless communication functionality. For example, interfaces 164 may include a wide area network card, a WiFi card, a wireless local area network card, a wired local area network card, an optical communication card, a radio access network (RAN) card, a wide area network (WAN) card, and/or other types of communication components. These components may support any number of wired/wireless channels 176.

Thus, from the perspective of an external device, the in-band components and out-of-band components of data processing system 104A may appear to be two independent network entities, that may independently addressable, and otherwise unrelated to one another.

To facilitate management of data processing system 104A over time, hardware resources 150, management controller 152 and/or network module 160 may be positioned in separately controllable power domains. By being positioned in these separate power domains, different subsets of these components may remain powered while other subsets are unpowered.

For example, management controller 152 and network module 160 may remain powered while hardware resources 150 is unpowered. Consequently, management controller 152 may remain able to communication with other devices even while hardware resources 150 are inactive. Similarly, management controller 152 may perform various actions while hardware resources 150 are not powered and/or are otherwise inoperable, unable to cooperatively perform various process, are compromised, and/or are unavailable for other reasons.

To implement the separate power domains, data processing system 104A may include a power source (e.g., 180) that separately supplies power to power rails (e.g., 184, 186) that power the respective power domains. Power from the power source (e.g., a power supply, battery, etc.) may be selectively provided to the separate power rails to selectively power the different power domains. A power manager (e.g., 182) may manage power from power source 180 is supplied to the power rails (e.g., by providing instructions via side band channels 174). Management controller 152 may cooperate with power manager 182 to manage supply of power to these power domains. Management controller 152 may communicate with power manager 182 via side band channels 174 and/or via other means.

In FIG. 1B, an example implementation of separate power domains using power rails 184-186 is shown. The power rails may be implemented using, for example, bus bars or other types of transmission elements capable of distributing electrical power. While not shown, it will be appreciated that the power domains may include various power management components (e.g., fuses, switches, etc.) to facilitate selective distribution of power within the power domains.

When providing its functionality, components of data processing system 104A may perform all, or a portion, of the methods and operations illustrated in FIGS. 2A-3.

While illustrated in FIG. 1B with a limited number of specific components, a system may include additional, fewer, and/or different components without departing from embodiments disclosed herein.

As discussed above, the components of FIGS. 1A-1B may perform various methods to manage secure communication between the cloud service system, data processing system and dependent data processing systems. FIGS. 2A-3 may illustrate examples of methods that may be performed by the components of FIGS. 1A-1B. For example, a management controller similar to management controller 152 and/or hardware resources similar to hardware resources 150 may perform all or a portion of the methods. In the diagrams discussed below and shown in FIGS. 2A-3, any of the operations may be repeated, performed in different orders, and/or performed in parallel with or in a partially overlapping in time manner with other operations.

To further clarify embodiments disclosed herein, interaction diagrams in accordance with an embodiment are shown in FIGS. 2A-2B. These interaction diagrams may illustrate how data may be obtained and used within the system of FIGS. 1A-1B.

In the interaction diagrams, processes performed by and interactions between components of a system in accordance with an embodiment are shown. In the diagrams, components of the system are illustrated using a first set of shapes (e.g., hardware resources 150, management controller 152, cloud service system 100, etc.), located towards the top of each figure. Lines descend from these shapes. Processes performed by the components of the system are illustrated using a second set of shapes (e.g., destination identification process 200, etc.) superimposed over these lines. Interactions (e.g., communication, data transmissions, etc.) between the components of the system are illustrated using a third set of shapes (e.g., 204, 206, etc.) that extend between the lines. The third set of shapes may include lines terminating in one or two arrows. Lines terminating in a single arrow may indicate that one way interactions (e.g., data transmission from a first component to a second component) occur, while lines terminating in two arrows may indicate that multi-way interactions (e.g., data transmission between two components) occur.

The lines descending from some of the first set of shapes (e.g., 150) is drawn in dashing to indicate, for example, that the corresponding components may not be (i) operable, (ii) powered on, (iii) present in the system, and/or (iv) not participating in operation of the system for other reasons.

Generally, the processes and interactions are temporally ordered in an example order, with time increasing from the top to the bottom of each page. For example, the interaction labeled as 206 may occur prior to the interaction labeled as 208. However, it will be appreciated that the processes and interactions may be performed in different orders, any may be omitted, and other processes or interactions may be performed without departing from embodiments disclosed herein.

Turning to FIG. 2A, a first interaction diagram in accordance with an embodiment is shown. The first interaction diagram may illustrate processes and interactions that may occur during an onboarding process of a data processing system to establish wipeout policies for the data processing system.

To initiate the onboarding process, at interaction 202, device identification may be provided to orchestrator 102 by administrative system 100. For example, the device identification may be provided to orchestrator 102 via (i) transmission via a message, (ii) storing in a storage with subsequent retrieval by orchestrator 102, (iii) via a publish-subscribe system where orchestrator 102 subscribes to updates from administrative system 100 thereby causing a copy of the device identification to be propagated to orchestrator 102, and/or via other processes. By providing the device identification to orchestrator 102, orchestrator 102 may receive a copy of the device information for data processing system 104A and provide provisioning services.

The device identification may include: (i) a payload indicating instructions for managing ownership voucher for the data processing system as part of an onboarding process, (ii) the identity of the data processing system, (iii) the identity of the administrative entity (e.g., administrative system 100) for data processing system 104A, (iv) wipeout policies for data processing system 104A and/or other data.

In FIG. 2A, the lines descending from the first set of shapes (e.g., hardware resources 150 and management controller 152) are drawn in dashes to indicate, for example, that the corresponding components may not be (i) operable, (ii) powered on, and/or (iii) present in the system. For example, prior to onboarding data processing system 104A and during transport of data processing system 104A to a user of the data processing system, hardware resources 150 and management controller 152 may be powered off.

Once data processing system 104A is obtained (e.g., physically by a user of the data processing system) and components of data processing system 104A (e.g., hardware resources 150 and management controller 152) are activated (e.g., operable, powered on, etc.), provisioning process 204 may be initiated. For example, upon receiving physical possession of data processing system 104A, a user may power on data processing system 104A (e.g., power on hardware and/or software components of data processing system 104A) which may activate provisioning process 204.

As part of the onboarding process, management controller 152, hardware resources 150, and orchestrator 102 may cooperatively perform provisioning process 204 to establish data processing system 104A as part of a deployment of data processing systems managed by an administrator (e.g., via administrative system 100) and place data processing system 104A under control of a control plane. During provisioning process 204, management controller 152 may obtain an ownership voucher from orchestrator 102 in the form of a message via an out-of-band communication channel. The ownership voucher may include (i) an entitlement certificate, (ii) at least one delegation of authority over data processing system 104A, and/or (iii) other information usable to onboard data processing system 104A.

The at least one delegation of authority over data processing system 104A may include at least one ownership certificate. The at least one ownership certificate may include: (i) a payload including a public key for the owner of data processing system 104A, (ii) a signature generated using a private key of a public private key pair maintained by the manufacturer, and/or (iii) other information. The at least one delegation of authority also may include a certificate chain. The certificate chain may establish cryptographically verifiable delegations of authority from a root of trust (e.g., the manufacturer) to the current owner via any number of transfer of authority.

The payload may include a statement of delegation indicating which privileges are being delegated to a management device (e.g., orchestrator 102) of data processing system (e.g., 104A). For example, the payload may indicate that all authority to manage, onboard, and/or otherwise modify data processing system 104A is being delegated to orchestrator 102. Orchestrator 102 may receive communications from an administrator (e.g., via administrative system 100) of data processing system 104A indicating instructions to manage operation of data processing system 104A. The public key for orchestrator 102 may be any public key (e.g., a string of letters, numbers, and/or other characters) associated with orchestrator 102 that is publicly available and usable to encrypt data intended to be decrypted by only data processing system 104A. The payload may include any number of such certificates that establish a cryptographically verifiable certificate chain between the root of trust and the public key associated with orchestrator 102.

The signature generated using the private key (e.g., the private key maintained by the manufacturer of data processing system 140) may include cryptographic information generated using the payload and the private key. The cryptographic information may include a hash of the information and/or any other type of cryptographic information.

Following provisioning process 204 and at interaction 206, orchestrator 102 may provide a wipeout policy to management controller 152 via out-of-band channel 220. Out-of-band channel 220 may be similar to any of out-of-band channels 172 described in FIG. 1B.

For example, the wipeout policy may be provided to management controller 152 via (i) transmission via a message, (ii) storing in a storage with subsequent retrieval by management controller 152, (iii) via a publish-subscribe system where management controller 152 subscribes to updates from orchestrator 102 thereby causing a copy of the wipeout policy to be propagated to management controller 152, and/or via other processes.

The wipeout policy may include at least: (i) a list of targets (e.g., types of data and portions of data stored by data processing system 104A), (ii) wipeout procedures for each of the targets, (iii) authorized entities (e.g., trusted devices) with authorization to initiate performance of the wipeout policy, (iv) procedures for validating wipeout requests (e.g., request to remove access to portions of data stored by the data processing system) and/or (v) other information usable to establish wiping process to remove access to data stored by data processing system 104A.

The list of targets (e.g., specified by the wipeout policy) may include specified portions of data hosted by the data processing system (e.g., 104A) at levels of granularity including at least: (i) all of the portions of the data stored in a particular hardware component (e.g., hardware resources 150), (ii) a portion of the data relating to credentialing for use of the data processing system, (iii) a portion of the data related to configuration of the data processing system, (iv) a portion of the data related to ownership of the data processing system, (v) a portion of the data related to end owner configuration of the data processing system, and/or (vi) other information regarding the targets of the data processing system.

The wipeout procedures for each of the targets may include allowable wipeout procedures for removing access to the corresponding portion of the data (e.g., stored by the data processing system). The wipeout procedures for each of the targets (e.g., portions of data) may include, for example, instructions to delete the data, encrypt the data using cryptographic information (e.g., secure password), generate a back up or copy of the data on a remote device (e.g., other secure data processing system) and delete the data from the data processing system (e.g., local copy of the data stored on a hard disk of data processing system), and/or other procedures to wipe or remove access to the portions of data.

Following receipt of the wipeout policy, management controller 152 may perform wipeout policy configuration process 208 to store the wipeout policy and manage wipeout requests (e.g., requests to remove a portion of data stored on the data processing system). During wipeout policy configuration process 208, management controller 152 may store a copy of the wipeout policy and configure procedures to verify, analyze, and/or manage requests to remove access to portions of data.

Turning to FIG. 2B, a second interaction diagram in accordance with an embodiment is shown. The second diagram may illustrate processes and interactions that may occur during management of wipeout requests for a data processing system.

To manage wipeout requests, at interaction 212, a request may be provided to orchestrator 102 by administrative system 100. For example, the request may be generated and provide to orchestrator 102 via (i) transmission via a message, (ii) storing in a storage with subsequent retrieval by orchestrator 102, (iii) via a publish-subscribe system where orchestrator 102 subscribes to updates from administrative system 100 thereby causing a copy of the request to be propagated to orchestrator 102, and/or via other processes. By providing the request to orchestrator 102, orchestrator 102 may receive a copy of the request.

The request may include: (i) a payload indicating modifications to data stored on the data processing system, (ii) the identity of the data processing system, (iii) the identity of the requesting entity (e.g., administrative system 100), and/or (iv) other data. For example, the request may indicate modifications (e.g., removal, restriction, etc.) to at least a portion of data stored on data processing system 104A.

In response to receiving the request, orchestrator 102 may perform wipeout initiation process 214. During wipeout initiation process 214, orchestrator 102 may identify the data processing system (e.g., data processing system 104A) that is the destination of the request and generate a wipeout request using at least the request obtained by orchestrator 102. Orchestrator 102 may include any portion of the information from the request in the wipeout request. The wipeout request may include at least: (i) a list of portion(s) of data stored on the data processing system that is requested to be removed, (ii) specific modification instructions for each portion of data to remove, (iii) a signature generated using the private key of the public private key pair maintained by orchestrator 102, and/or (iv) other information.

At interaction 216, the wipeout request may be provided to management controller 152 by orchestrator 102. For example, the wipeout request may be provided to management controller 152 via (i) transmission via a message, (ii) storing in a storage with subsequent retrieval by management controller 152, (iii) via a publish-subscribe system where management controller 152 subscribed to updates from orchestrator 102 thereby causing a copy of the wipeout request to be propagated to management controller 152, and/or via other processes. By providing the wipeout request to management controller 152, management controller 152 may obtain a copy of the wipeout request and provide wipeout request management services.

In response to receiving the wipeout request, management controller 152 may perform request analysis process 218. During request analysis process 218, management controller 152 may identify applicable wipeout policies for managing operations of a data processing system (e.g., 104A) based on at least the wipeout request.

For example, during request analysis process 218, management controller 152 may (i) identify portion(s) of data for removal from data processing system 104A (e.g., defined by the wipeout request), (ii) identify wipeout policies applicable to data processing system 104A based on, at least in part, the wipeout request, and/or (iii) attempt to verify authenticity of the wipeout request based on authentication requirements (e.g., specified by the identified wipeout policies).

The wipeout policies may: (i) define authentication requirements (what authorizations are required and/or identity of requesting entities with authorization), (ii) define targets that specify portions of data (e.g., cryptographic data, application data, credential data, etc.) hosted by the data processing system, (iii) specify, for each target, allowable wipeout procedures for removing access to the corresponding portion of data, and/or (iv) other information. For example, management controller 152 may identify the applicable wipeout policy for data processing system 104A based at least on the wipeout request (e.g., portion of data for removal) and identify the authentication requirements based on the wipeout policy to verify the authenticity of the wipeout request.

Attempting to verify authenticity of the wipeout request may include: (i) obtaining, by management controller 152, an identity of a requesting entity based on, at least in part, the wipeout request, (ii) performing a comparison process using the identity of the requesting entity and the authentication requirements to determine whether the requesting entity is authorized to initiate removal of portion(s) of data from the data processing system (e.g., 104A), and/or (iii) other methods. For example, if the identity of the requesting entity indicated by the wipeout request matches an identity of an authorized entity, management controller 152 may determine the requesting entity is authorized (e.g., the wipeout request is trustworthy). Conversely, if the identity of the requesting entity does not match an identity of an authorized entity (e.g., specified by the wipeout policy), management controller 152 may determine the requesting entity does not have authority to initiate removal of portions of data (e.g., the wipeout request is not trustworthy) and may reject the wipeout request based on the wipeout request not being trustworthy.

If the wipeout request is authenticated (e.g., the wipeout request is determined to be trustworthy), as part of request analysis process 218, management controller 152 may (i) identify a removal workflow to be performed based on, at least in part, the identified wipeout policies and the identified portion(s) of data for removal, (ii) perform a comparison process, using the wipeout request and the removal workflow, to determine whether the wipeout request conflicts with the removal workflow, and/or (iii) perform any other actions to manage wipeout requests for the data processing system.

If it is determined that at least one conflict exists, management controller 152 may perform a conflict resolution process to identify an action set (e.g., a first action set) to be performed. The conflict resolution process may include identifying procedures to resolve identified conflicts and may be defined by a user or an administrator of data processing system 104A. For example, if the wipeout request is verified as trustworthy (e.g., obtained from an requesting entity with authorization to initiate removal of the corresponding portion of data) but the removal instructions (e.g., delete the portion of data, encrypt the portion of data, etc.) specified by the wipeout request does not match the removal instructions (e.g., removal workflow) for the portion of data as specified by the wipeout policy, management controller 152 may identify a resolution procedure to resolve the removal instruction conflict.

If it is determined that no conflict exists, management controller 152 may perform an action set (e.g., second action set) based on the wipeout request to service the wipeout request. For example, management controller 152 may facilitate removal of the portion(s) of data (e.g., specified by the wipeout request) by providing instructions to hardware resources 150 (or a specified component of hardware resources) to remove access to the portion of data (e.g., in a manner as specified by the wipeout request).

Following request analysis process 218, management controller 152, hardware resources 150, and orchestrator 102 may cooperatively perform request servicing process 220 to perform an action set (e.g., obtained as a result of request analysis process 218) in order to service the wipeout request. The action set may include: (i) adding a log entry specifying that at least one conflict exists, and performing an implementation action to implement a portion of the wipeout request that is in conflict with the wipeout policy, (ii) for a portion of the wipeout request that is in conflict with the wipeout policy: at least temporarily delaying performance of any action based on the portion of the wipeout request, and while the performance is temporarily delayed, performing a remedial action set based on the portion of the wipeout request to attempt to authenticate the portion of the wipeout request, (iii) rejecting the wipeout request, (iv) performing removal of the portion of data (e.g., as specified by the wipeout request), and/or (v) other actions.

Following request servicing process 220, and at interaction 222, a notification may be provided to administrative system 100 by orchestrator 102. For example, the notification may be generated and provided to administrative system 100 via (i) transmission via a message, (ii) storing in a storage with subsequent retrieval by administrative system 100, (iii) via a publish-subscribe system where administrative system 100 subscribes to updates from orchestrator 102, and/or via other processes. By providing the notification to administrative system 100, administrative system 100 may receive a status of the request (e.g., for removal of portions of data from data processing system 104A).

Any of the processes illustrated using the second set of shapes and interactions illustrated using the third set of shapes may be performed, in part or whole, by digital processors (e.g., central processors, processor cores, etc.) that execute corresponding instructions (e.g., computer code/software). Execution of the instructions may cause the digital processors to initiate performance of the processes. Any portions of the processes may be performed by the digital processors and/or other devices. For example, executing the instructions may cause the digital processors to perform actions that directly contribute to performance of the processes, and/or indirectly contribute to performance of the processes by causing (e.g., initiating) other hardware components to perform actions that directly contribute to the performance of the processes.

Any of the processes illustrated using the second set of shapes and interactions illustrated using the third set of shapes may be performed, in part or whole, by special purpose hardware components such as digital signal processors, application specific integrated circuits, programmable gate arrays, graphics processing units, data processing units, and/or other types of hardware components. These special purpose hardware components may include circuitry and/or semiconductor devices adapted to perform the processes. For example, any of the special purpose hardware components may be implemented using complementary metal-oxide semiconductor based devices (e.g., computer chips).

Any of the processes and interactions may be implemented using any type and number of data structures. The data structures may be implemented using, for example, tables, lists, linked lists, unstructured data, data bases, and/or other types of data structures. Additionally, while described as including particular information, it will be appreciated that any of the data structures may include additional, less, and/or different information from that described above. The informational content of any of the data structures may be divided across any number of data structures, may be integrated with other types of information, and/or may be stored in any location.

As discussed above, the components of FIGS. 1A-1B may perform various methods to manage endpoint devices. FIG. 3 illustrates methods that may be performed by the components of FIGS. 1A-1B. In the diagrams discussed below and shown in FIG. 3, any of the operations may be repeated, performed in different orders, and/or performed in parallel with or in a partially overlapping in time manner with other operations.

Turning to FIG. 3, a flow diagram illustrating a method of managing operations of a data processing system in accordance with an embodiment is shown. The method may be performed, for example, by any of the components of the system shown in FIGS. 1A-1B.

Prior to operation 300, during an onboarding process for a data processing system to add the data processing system to a deployment and place the data processing system under control of a control plane that manages the deployment: obtaining, from an orchestrator of the control plane and via the out-of-band channel, the wipeout policy for the data processing system.

At operation 300, a wipeout request may be obtained via an out-of-band channel. The wipeout request may indicate that a portion of data stored on a data processing system is to be removed. The wipeout request may be obtained by: (i) receiving the wipeout request as a transmission (via a network module of the data processing system) from an external entity (e.g., orchestrator), (ii) reading the wipeout request from storage, and/or (iii) other methods.

At operation 302, a wipeout policy that governs the wipeout request may be identified. The wipeout policy may be identified by: (i) identifying, by the management controller, a target of the wipeout request, the target specifying a portion of data hosted by the data processing system, (ii) based on the identified target, identifying, by the management controller, the wipeout policy corresponding to the identified target, and/or (iii) other methods.

At operation 304, verify authenticity of the wipeout request may be attempted based on authentication requirements specified by the wipeout policy. Attempting to verify authenticity of the wipeout request may include: (i) obtaining, by the management controller, an identify of a requesting entity based at least in part on the wipeout request, (ii) performing a comparison process using the identity of the requesting entity and the authentication requirements to determine whether the requesting entity is authorized to initiate removal of portions of data from the data processing system, (iii) in a first instance of performing the comparison process where the requesting entity is authorized: concluding the wipeout request is trustworthy, (iv) in a second instance of performing the comparison process where the requesting entity is not the authorized device: concluding that the wipeout request is not trustworthy, and rejecting the wipeout request based on the wipeout request not being trustworthy.

At operation 306, a determination may be made regarding whether the wipeout request is authenticated. The determination may be made based on the conclusion of the methods performed during operation 304, for example, by performing the comparison process and concluding whether the wipeout request is trustworthy. If it is determined that the wipeout request is not authenticated (e.g., the determination is "No" at operation 306), then the method may proceed to operation 308.

At operation 308, the wipeout request may be rejected. The wipeout request may be rejected by the management controller, for example, by denying performance of any action specified by the wipeout request, and/or performing other actions relating to rejecting the wipeout request.

Returning to operation 306, if it is determined that the wipeout request is authenticated (e.g., the determination is "Yes" at operation 306), then the method may proceed to operation 310.

At operation 310, the wipeout request and the wipeout policy may be analyzed to identify whether any conflicts exist. The wipeout request and the wipeout policy may be analyzed by: (i) identifying, based on the wipeout request, the portion of data for removal, (ii) identifying, based on the wipe policy and the identified portion of data, a removal workflow to be performed, and/or (iii) performing a comparison processing using the wipeout request and the removal workflow to determine whether the wipeout request conflicts with the removal workflow.

At operation 312, a determination may be made regarding whether at least one conflict exists. The determination may be made based on the methods performing during operation 310, for example, by performing the comparison process using the wipeout request and the removal workflow and identifying whether the wipeout request (e.g., portion of data for removal) conflicts with the removal workflow. If it is determined that at least one conflict exists (e.g., the determination is "Yes" at operation 312), then the method may proceed to operation 314.

At operation 314, a conflict resolution process may be performed to identify a first action set to perform. The conflict resolution process may be performed by (i) identifying the conflict between the wipeout request and the removal workflow (e.g., obtained via methods specified in operation 310), (ii) identifying, using the identified conflict and based on the wipeout policy, the first action set, and/or (iii) any other methods. For example, a management controller of data processing system 104A may verify the authenticity of the wipeout request (e.g., validating the signature of the wipeout request) but may identify a conflict between the wipeout request and the wipeout policy when the wipeout request indicates removal of all data on a hard disk drive of the data processing system and the wipeout policy indicates to only encrypt the data. Consequently, the management controller may identify the first action set based on the identified conflict and the conflict resolution parameters (e.g., set by a user and/or administrator of the data processing system).

At operation 316, the first action set may be performed. The first action set may be performed by a management controller to service the wipeout request.

In a first example, performing the first action set may include: (i) adding a log entry specifying that the at least one conflict exists, and (ii) performing an implementation action to implement a portion of the wipeout request that is in conflict with the wipeout policy.

In a second example, performing the first action set may include, for a portion of the wipeout request that is in conflict with the wipeout policy: (i) at least temporarily delaying performance of any action based on the portion of the wipeout request, and (ii) while the performance is temporarily delayed, performing a remedial action set based on the portion of the wipeout request to attempt to authenticate the portion of the wipeout request.

In a third example, performing the first action set may include rejecting the wipeout request. The wipeout request may be rejected by the management controller, for example, by denying performance of any action specified by the wipeout request, and/or performing other actions relating to rejecting the wipeout request.

Returning to operation 312, if it is determined that at least one conflict exists (e.g., the determination is "Yes" at operation 312), then the method may proceed to operation 318.

At operation 318, a second action set may be performed based on the wipeout request to service the wipeout request. The second action set may be performed by (i) identifying, based on the wipeout request, the target (e.g., portion of hardware resources of the data processing system) and/or (ii) executing the wipeout procedures for removing access to the corresponding portion of the data in order to service the wipeout request. The second action set may be performed by the management controller, for example, by encrypting the portions of data (e.g., specified by the wipeout request), deleting the portions of data stored in a hardware component of data processing system 104A, and/or performing other actions relating to disabling (e.g., limiting, deleting, etc.) access of the portion of the data specified by the wipeout request.

The method may end following operation 318.

Figure 4:
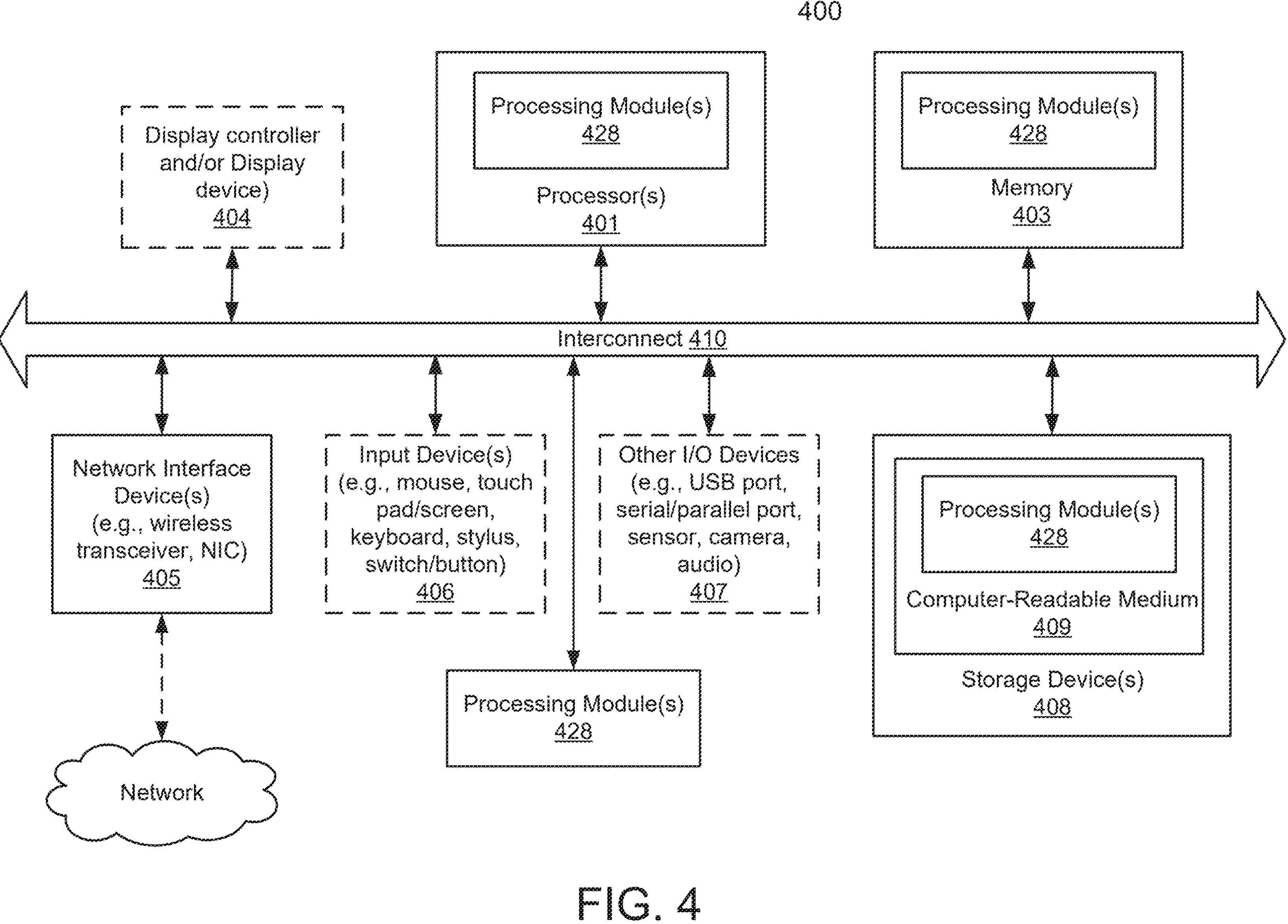
FIG. 4 shows a block diagram illustrating a data processing system in accordance with an embodiment.

Any of the components illustrated in FIGS. 1A-3 may be implemented with one or more computing devices. Turning to FIG. 4, a block diagram illustrating an example of a data processing system (e.g., a computing device) in accordance with an embodiment is shown. For example, system 400 may represent any of data processing systems described above performing any of the processes or methods described above. System 400 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 400 is intended to show a high-level view of many components of the computer system. However, it is to be understood that additional components may be present in certain implementations and furthermore, different arrangement of the components shown may occur in other implementations. System 400 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 400 includes processor 401, memory 403, and devices 405-407 via a bus or an interconnect 410. Processor 401 may represent a single processor or multiple processors with a single processor core or multiple processor cores included therein. Processor 401 may represent one or more general-purpose processors such as a microprocessor, a central processing unit (CPU), or the like. More particularly, processor 401 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 401 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 401, which may be a low power multi-core processor socket such as an ultra-low voltage processor, may act as a main processing unit and central hub for communication with the various components of the system. Such processor can be implemented as a system on chip (SoC). Processor 401 is configured to execute instructions for performing the operations discussed herein. System 400 may further include a graphics interface that communicates with optional graphics subsystem 404, which may include a display controller, a graphics processor, and/or a display device.

Processor 401 may communicate with memory 403, which in one embodiment can be implemented via multiple memory devices to provide for a given amount of system memory. Memory 403 may include one or more volatile storage (or memory) devices such as random-access memory (RAM), dynamic RAM (DRAM), synchronous DRAM (SDRAM), static RAM (SRAM), or other types of storage devices. Memory 403 may store information including sequences of instructions that are executed by processor 401, or any other device. For example, executable code and/or data of a variety of operating systems, device drivers, firmware (e.g., input output basic system or BIOS), and/or applications can be loaded in memory 403 and executed by processor 401. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 400 may further include IO devices such as devices (e.g., 405, 406, 407, 408) including network interface device(s) 405, optional input device(s) 406, and other optional IO device(s) 407. Network interface device(s) 405 may include a wireless transceiver and/or a network interface card (NIC). The wireless transceiver may be a Wi-Fi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 406 may include a mouse, a touch pad, a touch sensitive screen (which may be integrated with a display device of optional graphics subsystem 404), a pointer device such as a stylus, and/or a keyboard (e.g., physical keyboard or a virtual keyboard displayed as part of a touch sensitive screen). For example, input device(s) 406 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 407 may include an audio device. An audio device may include a speaker and/or a microphone to facilitate voice-enabled functions, such as voice recognition, voice replication, digital recording, and/or telephony functions. Other IO devices 407 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 407 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 410 via a sensor hub (not shown), while other devices such as a keyboard or thermal sensor may be controlled by an embedded controller (not shown), dependent upon the specific configuration or design of system 400.

To provide for persistent storage of information such as data, applications, one or more operating systems and so forth, a mass storage (not shown) may also couple to processor 401. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as an SSD cache to enable non-volatile storage of context state and other such information during power down events so that a fast power up can occur on re-initiation of system activities. Also, a flash device may be coupled to processor 401, e.g., via a serial peripheral interface (SPI). This flash device may provide for non-volatile storage of system software, including a basic input/output software (BIOS) as well as other firmware of the system.

Storage device 408 may include computer-readable storage medium 409 (also known as a machine-readable storage medium or a computer-readable medium) on which is stored one or more sets of instructions or software (e.g., processing module, unit, and/or processing module/unit/logic 428) embodying any one or more of the methodologies or functions described herein. Processing module/unit/logic 428 may represent any of the components described above. Processing module/unit/logic 428 may also reside, completely or at least partially, within memory 403 and/or within processor 401 during execution thereof by system 400, memory 403 and processor 401 also constituting machine-accessible storage media. Processing module/unit/logic 428 may further be transmitted or received over a network via network interface device(s) 405.

Computer-readable storage medium 409 may also be used to store some software functionalities described above persistently. While computer-readable storage medium 409 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of embodiments disclosed herein. The term "computer-readable storage medium" shall accordingly be taken to include, but not be limited to, solid-state memories, and optical and magnetic media, or any other non-transitory machine-readable medium.

Processing module/unit/logic 428, components and other features described herein can be implemented as discrete hardware components or integrated in the functionality of hardware components such as ASICS, FPGAs, DSPs, or similar devices. In addition, processing module/unit/logic 428 can be implemented as firmware or functional circuitry within hardware devices. Further, processing module/unit/logic 428 can be implemented in any combination hardware devices and software components.

Note that while system 400 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

What is claimed is:

1. A method for managing operation of a data processing system, the method comprising:

obtaining, via an out-of-band communication channel and by a management controller that is physically installed in the data processing system as a separate and independently operating computing device from the data processing system, a wipeout request, the wipeout request indicating that a portion of data stored on the data processing system is to be removed, the portion of the data being stored in hardware resources of the data processing system, and the data processing system further comprises a single network module that is shared by both of the management controller and the hardware resources;

identifying, by the management controller, a wipeout policy that governs the wipeout request;

attempting to verify authenticity of the wipeout request based on authentication requirements specified by the wipeout policy;

in a first instance of the attempting where the wipeout request is authenticated:

analyzing the wipeout request and the wipeout policy to identify whether any conflicts exist; and in a first instance of the analyzing where at least one conflict exists:

performing a conflict resolution process to identify a first action set to perform; and performing the first action set to service the wipeout request; and in a second instance of the analyzing where no conflicts exist:

performing a second action set based on the wipeout request to service the wipeout request, wherein the single network module is adapted to separately advertise network endpoints for the management controller and the hardware resources such that first communications meant for the hardware resources never flow through the management controller and second communications meant for the management controller never flow through the hardware resources.

2. The method of claim 1, wherein the first action set comprises:

adding a log entry specifying that the at least one conflict exists; and performing an implementation action to implement a portion of the wipeout request that is in conflict with the wipeout policy.

3. The method of claim 1, wherein the first action set comprises:

for a portion of the wipeout request that is in conflict with the wipeout policy:

at least temporarily delaying performance of any action based on the portion of the wipeout request; and while the performance is temporarily delayed, performing a remedial action set based on the portion of the wipeout request to attempt to authenticate the portion of the wipeout request.

4. The method of claim 1, wherein the first action set comprises:

rejecting the wipeout request.

5. The method of claim 1, wherein the wipeout policy specifies:

targets that specify portions of the data hosted by the data processing system, wherein the targets specify the portions of the data at levels of granularity from a list of levels of granularity consisting of:

all of the portions of the data stored in a particular hardware component, the particular hardware component being one of the hardware resources of the data processing system;

a portion of the data relating to credentialing for use of the data processing system;

a portion of the data related to configuration of the data processing system;

a portion of the data related to ownership of the data processing system; and a portion of the data related to end owner configuration of the data processing system.

6. The method of claim 5, wherein the wipeout policy further specifies:

for each target of the targets, allowable wipeout procedures for removing access to the corresponding portion of the data.

7. The method of claim 1, wherein attempting to verify authenticity of the wipeout request comprises:

obtaining, by the management controller, an identity of a requesting entity based at least in part on the wipeout request;

performing a comparison process using the identity of the requesting entity and the authentication requirements to determine whether the requesting entity is authorized to initiate removal of portions of data from the data processing system;

in a first instance of performing the comparison process where the requesting entity is authorized:

concluding that wipeout request is trustworthy;

in a second instance of performing the comparison process where the requesting entity is not authorized to initiate the removal of the portions of the data from the data processing system:

concluding that the wipeout request is not trustworthy; and rejecting the wipeout request based on the wipeout request not being trustworthy.

8. The method of claim 1, wherein analyzing the wipeout request comprises:

identifying, based on the wipeout request, the portion of data for removal;

identifying, based on the wipeout policy and the identified portion of data, a removal workflow to be performed; and performing a comparison process using the wipeout request and the removal workflow to determine whether the wipeout request conflicts with the removal workflow.

9. The method of claim 8, further comprising:

during an onboarding process for the data processing system to add the data processing system to a deployment and place the data processing system under control of a control plane that manages the deployment:

obtaining, from an orchestrator of the control plane and via the out-of-band communication channel, the wipeout policy for the data processing system.

10. The method of claim 1, wherein the network endpoints being usable by a server to separately address the first communications to the hardware resources using an in-band communication channel and second communications to the management controller using the out-of-band communication channel, and the management controller and the single network module are on separate power domains from the hardware resources so that the management controller and the single network module are operable while the hardware resources are inoperable.

11. The method of claim 1, wherein the out-of-band communication channel runs through the single network module, and an in-band communication channel that services the hardware resources also runs through the single network module.

12. The method of claim 1, wherein the single network module hosts a transmission control protocol/internet protocol (TCP/IP) stack to facilitate network communications via the out-of-band communication channel.

13. A non-transitory machine-readable medium having instructions stored therein, which when executed by a management controller, cause the management controller to perform operations for managing operation of a data processing system, the operations comprising:

obtaining, via an out-of-band communication channel and by the management controller that is physically installed in the data processing system as a separate and independently operating computing device from the data processing system, a wipeout request, the wipeout request indicating that a portion of data stored on the data processing system is to be removed, the portion of the data being stored in hardware resources of the data processing system, and the data processing system further comprises a single network module that is shared by both of the management controller and the hardware resources;

identifying, by the management controller, a wipeout policy that governs the wipeout request;

attempting to verify authenticity of the wipeout request based on authentication requirements specified by the wipeout policy;

in a first instance of the attempting where the wipeout request is authenticated:

analyzing the wipeout request and the wipeout policy to identify whether any conflicts exist; and in a first instance of the analyzing where at least one conflict exists:

performing a conflict resolution process to identify a first action set to perform; and performing the first action set to service the wipeout request; and in a second instance of the analyzing where no conflicts exist:

performing a second action set based on the wipeout request to service the wipeout request, wherein the single network module is adapted to separately advertise network endpoints for the management controller and the hardware resources such that first communications meant for the hardware resources never flow through the management controller and second communications meant for the management controller never flow through the hardware resources.

14. The non-transitory machine-readable medium of claim 13, wherein the first action set comprises:

adding a log entry specifying that the at least one conflict exists; and performing an implementation action to implement a portion of the wipeout request that is in conflict with the wipeout policy.

15. The non-transitory machine-readable medium of claim 13, wherein the first action set comprises:

for a portion of the wipeout request that is in conflict with the wipeout policy:

at least temporarily delaying performance of any action based on the portion of the wipeout request; and while the performance is temporarily delayed, performing a remedial action set based on the portion of the wipeout request to attempt to authenticate the portion of the wipeout request.

16. The non-transitory machine-readable medium of claim 13, wherein the first action set comprises:

rejecting the wipeout request.

17. A data processing system, comprising:

a management controller; and a memory coupled to the management controller to store instructions, which when executed by the management controller, cause the management controller to perform operations for managing operation of the data processing system, the operations comprising:

obtaining, via an out-of-band communication channel and by the management controller that is physically installed in the data processing system as a separate and independently operating computing device from the data processing system, a wipeout request, the wipeout request indicating that a portion of data stored on the data processing system is to be removed, the portion of the data being stored in hardware resources of the data processing system, and the data processing system further comprises a single network module that is shared by both of the management controller and the hardware resources;

identifying, by the management controller, a wipeout policy that governs the wipeout request;

attempting to verify authenticity of the wipeout request based on authentication requirements specified by the wipeout policy;

in a first instance of the attempting where the wipeout request is authenticated:

analyzing the wipeout request and the wipeout policy to identify whether any conflicts exist; and in a first instance of the analyzing where at least one conflict exists:

performing a conflict resolution process to identify a first action set to perform; and performing the first action set to service the wipeout request; and in a second instance of the analyzing where no conflicts exist:

performing a second action set based on the wipeout request to service the wipeout request, wherein the single network module is adapted to separately advertise network endpoints for the management controller and the hardware resources such that first communications meant for the hardware resources never flow through the management controller and second communications meant for the management controller never flow through the hardware resources.

18. The data processing system of claim 17, wherein the first action set comprises:

adding a log entry specifying that the at least one conflict exists; and performing an implementation action to implement a portion of the wipeout request that is in conflict with the wipeout policy.

19. The data processing system of claim 17, wherein the first action set comprises:

for a portion of the wipeout request that is in conflict with the wipeout policy:

at least temporarily delaying performance of any action based on the portion of the wipeout request; and while the performance is temporarily delayed, performing a remedial action set based on the portion of the wipeout request to attempt to authenticate the portion of the wipeout request.

20. The data processing system of claim 17, wherein the first action set comprises:

rejecting the wipeout request.

* * * * *